United States Patent [19]
Watanabe et al.

[11] 3,906,335
[45] Sept. 16, 1975

[54] FREQUENCY REGULATING DEVICE FOR A.C. SYSTEMS INTERCONNECTED THROUGH D.C. SYSTEMS

[75] Inventors: Atsumi Watanabe; Hisao Amano; Akira Isono, all of Hitachi, Japan

[73] Assignee: Hitachi, Ltd., Japan

[22] Filed: Mar. 11, 1974

[21] Appl. No.: 450,187

[30] Foreign Application Priority Data
Mar. 12, 1973  Japan.................................. 48-28015

[52] U.S. Cl...................................... 321/2; 307/82
[51] Int. Cl.² .......................................... H02J 3/36
[58] Field of Search ................. 321/2, 4; 307/73, 82

[56] References Cited
UNITED STATES PATENTS

| | | | |
|---|---|---|---|
| 2,832,029 | 4/1958 | Forssell..................................... | 321/2 |
| 3,275,838 | 9/1966 | Almstrom................................ | 321/2 |
| 3,470,442 | 9/1969 | Ainsworth................................ | 321/2 |
| 3,526,779 | 9/1970 | Uhlmann ................................ | 307/20 |
| 3,644,820 | 2/1972 | Ainsworth................................ | 321/2 |

*Primary Examiner*—William H. Beha, Jr.
*Attorney, Agent, or Firm*—Craig & Antonelli

[57] ABSTRACT

In a system interconnection composed of two a.c. systems, two converters connected with the respective a.c. systems and a d.c. power transmission system, one of the converters or rectifier is subject to constant current control and the other or inverter is subject to constant margin angle control. In the control system, the difference between the frequencies of the a.c. systems to which the respective converters are connected is utilized for modifying the set point of control. The greater the frequency difference, the rate of modification of the set point is increased so as to minimize the frequency difference between the a.c. systems remaining after control.

4 Claims, 12 Drawing Figures

FREQUENCY REGULATING DEVICE FOR A.C. SYSTEMS INTERCONNECTED THROUGH D.C. SYSTEMS

This invention relates to the art of system interconnection, and more particularly to a control system for a system interconnection in which two a.c. systems are interconnected by a d.c. system so that power can be smoothly and reliably transmitted from one of the a.c. systems to the other and the frequency in the individual a.c. systems can be fully stabilized.

It is commonly known that parallel operation of power systems in a large-scale electrical power system provides such great economical advantages that a power plant of large capacity can be constructed to serve the entire systems and the power requirement for stand-by service can be reduced. On the other hand, however, this manner of operation involves various defects relating to the reliability of power supply in that circuit breakers of large capacity are required to deal with an unusually large current appearing as a result of occurrence of short-circuit or other fault in the system and that such fault may lead to large-scale interruption of service in the entire systems.

In view of teh defects above described, an attempt has been made in which an electrical power system is divided into a plurality of systems of small scale and these subdivided systems are interconnected so that these subdivided systems can be operated substantially as a single system and an unusually large current may not appear even in the event of occurrence of fault. This interconnection is broadly divided into a so-called a.c. interconnection in which two a.c. systems are directly interconnected as disclosed in, for example, U.S. Pat. No. 3,657,728, and a so-called d.c. interconnection in which two a.c. systems are interconnected by a d.c. system. The present invention relates to the latter kind of interconnection.

In the latter kind of interconnection, a converter is disposed at each of the interconnected points between two a.c. systems and these two converters are connected to each other by a d.c. transmission line. One of these two converters is a rectifier for converting a.c. power into d.c. power, and the other converter is an inverter for converting the d.c. power into a.c. power again. These two converters are controlled by detecting the difference between the frequencies of the a.c. systems to which they are connected. In other words, these two converters are controlled so that power can be transmitted from the a.c. system of higher frequency to the a.c. system of lower frequency depending on the frequency difference. When the converters are controlled in the manner above described, the generated power and load in these two a.c. systems can be balanced and the interconnecting means can attain the desired function. Thus, even when fault may occur in one of the a.c. systems, an unusually large current due to this fault is not supplied to the other a.c. system due to the fact that the latter is separated from the former by the d.c. system.

The d.c. interconnection is useful for the interconnection between two a.c. systems as above described. However, power transmission between the two a.c. systems while merely controlling the converters depending on the frequency difference between these two a.c. system is insufficient in that an offset is inevitably involved in the control system. Thus, the prior art manner of interconnection has been defective in that the desired interconnecting function cannot be fully attained since frequency variations of considerable degree result in a great frequency difference remaining still after control.

It is therefore an object of the present invention to provide a control system for a system interconnection consisting of a.c. systems interconnected by a d.c. system, in which means are provided so that any appreciable frequency difference may not remain after control even when considerable frequency variations may occur in the a.c. systems interconnected by the d.c. system.

The present invention is featured by the fact that power being transmitted from one of the a.c. systems to the other is controlled in non-linear fashion depending on the difference between the frequencies of the two a.c. systems so as to minimize the frequency difference remaining after control.

The above and other objects, features and advantages of the present invention will be apparent from the following detailed description taken in conjunction with the accompanying drawings, in which.

Figure 1:
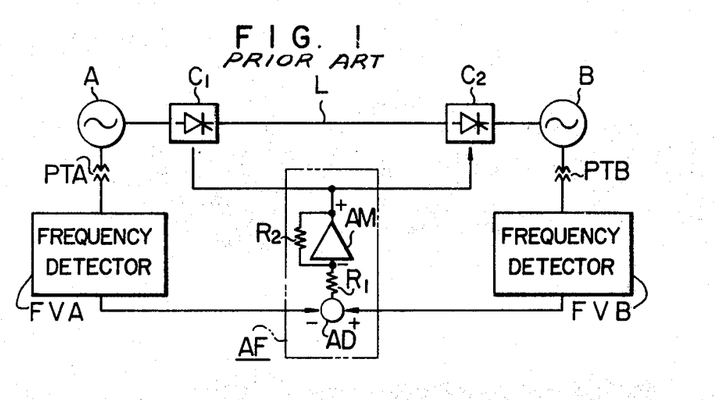
FIG. 1 is a simplified block diagram of a prior art system interconnection for illustrating the necessity of the present invention.
Figure 2:
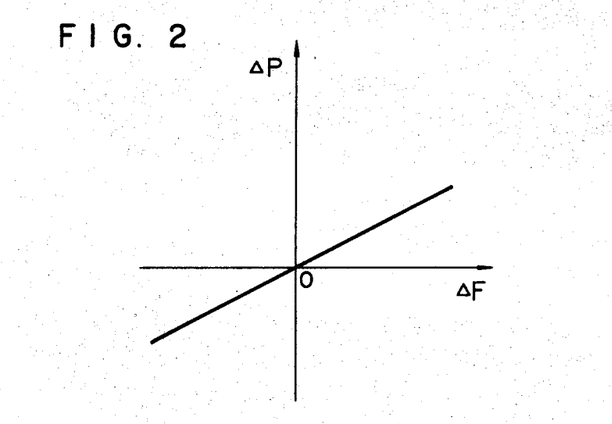
FIG. 2 is a graph showing the characteristic of the control means shown in FIG. 1.

Referring to FIG. 1 showing a prior art system interconnection, two a.c. systems A and B are interconnected by an converter $C_1$, a d.c. transmission line L and another converter $C_2$. Frequency detectors FVA and FVB detect the frequencies of the a.c. systems A and B on the basis of the voltages applied from voltage transformers PTA and PTB respectively and deliver positive d.c. voltages of levels proportional to the respective detected frequencies. A frequency control circuit AF is provided for suppressing frequency variations in the a.c. systems A and B. An adder AD in the frequency control circuit AF detects the difference between the output of the detector FVA and the output of the detector FVB, and the output of the adder AD is amplified by an operational amplifier AM so as to suitably modify the settings of the converters $C_1$ and $C_2$. The gain of this amplifier AM is determined by the ratio between resistors $R_2$ and $R_1$. Therefore, $\Delta F$ and $\Delta P$ have a proportional relationship as shown in FIG. 2 in which $\Delta F$ is the frequency difference between the a.c. systems A and B detected by the adder AD and $\Delta P$ is the variation of the power being transmitted through the d.c. system due to the variation of the output of the frequency control circuit AF relative to $\Delta F$. In FIG. 2, it is supposed that the direction of power transmission is from the system A to the system B and the frequency difference ΔF is positive when the frequency of the system A is higher than that of the system B.

Figure 3:
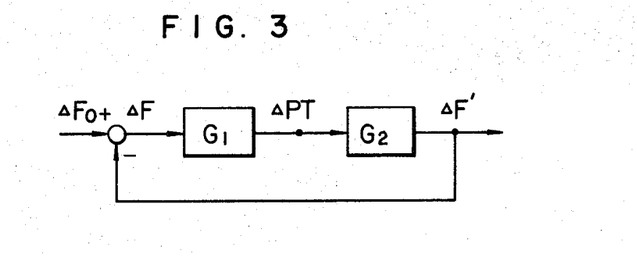
FIG. 3 is a block diagram showing the interconnection in FIG. 1 in terms of transfer functions.

Consider now the effect of suppression of frequency variations with such a manner of control. Suppose that a frequency difference of $\Delta F_o$ exists between the two a.c. systems A and B, the power being transmitted through the d.c. transmission line L is varied by $\Delta P_T$ as a result of corresponding control, and consequently, the frequency difference is improved to ΔF. These values have a relationship as shown in FIG. 3. In FIG. 3, ΔF' is the corrected frequency difference, $G_1$ is a transfer function given by dividing the power variation in the transmission line by the frequency difference, and $G_2$ is a transfer function given by $$\left(\frac{1}{KA} + \frac{1}{KB}\right)$$

where KA and KB are system constants in MW/Hz of the respective systems A and B.

From FIG. 3, the following equation can be obtained:

$$\Delta F'/\Delta F_o = G_1 \cdot G_2/(1 + G_1 \cdot G_2) \quad (1)$$

Therefore, $$\Delta F/\Delta F_o = 1/(1 + G_1 \cdot G_2) \quad (2)$$

The equation (2) exhibits the frequency improving effect by the d.c. interconnection shown in FIG. 1. Thus, the frequency variation can be suppressed to a fraction of the value obtained in the case where such d.c. interconnection is not provided, although the effect of suppression differs depending on the values of $G_1$ and $G_2$.

However, as will be apparent from FIG. 3, an offset is inevitably involved in the control system shown in FIG. 1 due to the fact that the control system is composed essentially of proportional elements only. Therefore, when the original frequency variation $\Delta F_o$ is considerably large, the resultant frequency difference ΔF is correspondingly large and the desired control effect cannot be fully attained.

The present invention is based on the finding that an increase in $G_1$ in the equation (2) can reduce the frequency difference remaining after control, and instead of simply determining the power in the d.c. system so as to be proportional to the frequency difference, the rate of increase in the supplied d.c. power is increased with the increase in the frequency difference so as to increase $G_1$ in the equation (2) thereby minimizing the frequency difference remaining after control.

Figure 4:
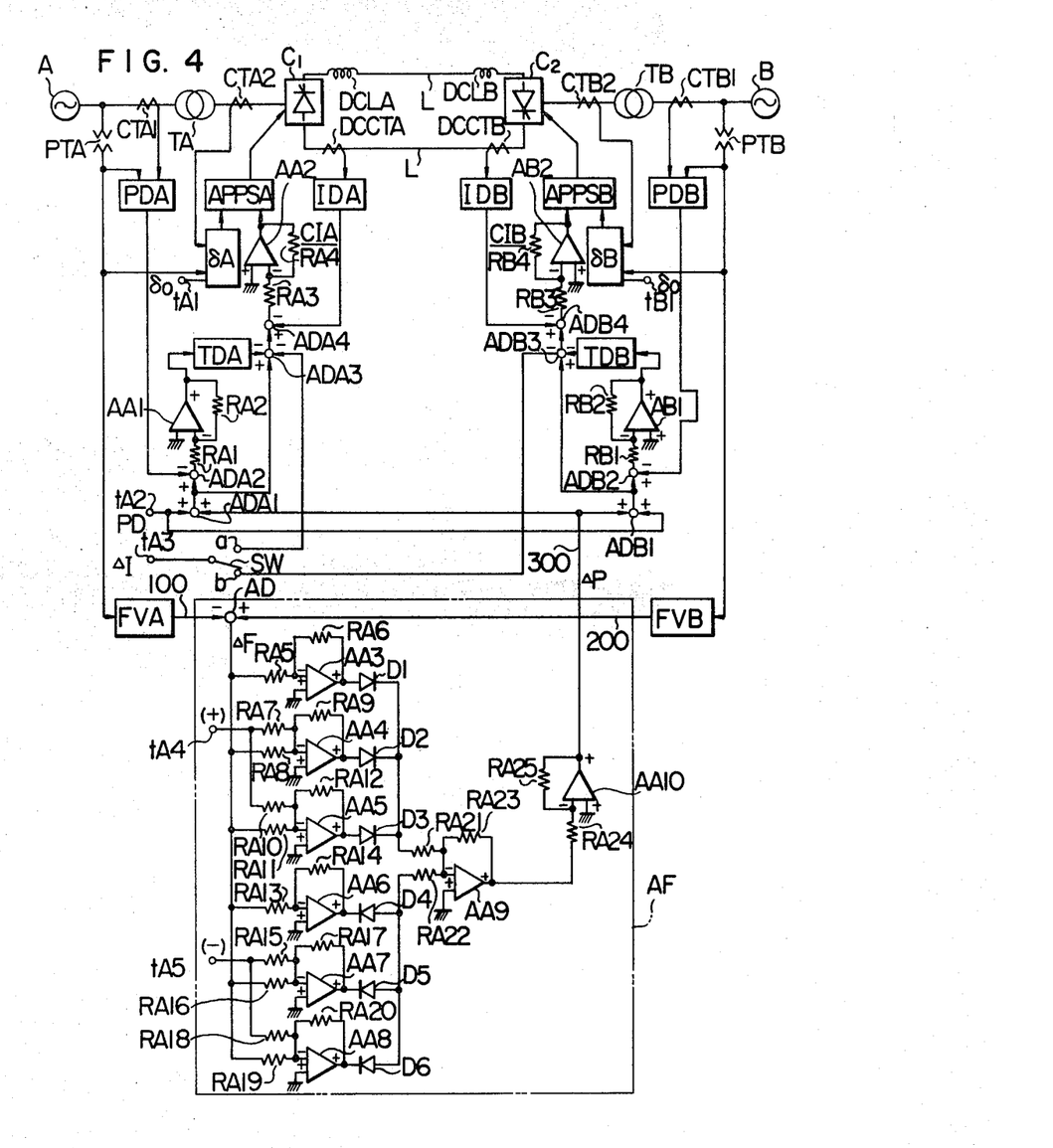
FIG. 4 is a block diagram of an embodiment of the present invention.

FIG. 4 is a block diagram of an embodiment of the present invention and like reference numerals are used therein to denote like parts appearing in FIG. 1. Referring to FIG. 4, the control system includes transformers TA and TB, d.c. reactors DCLA and DCLB, current transformers CTA1, CTA2, CTB1 and CTB2, and direct current transformers DCCTA and DCCTB. Automatic pulse phase shifters APPSA and APPSB are controlled by respective signals applied from constant current control means CIA and CIB or constant margin angle control means δA and δB as described later. The constant margin angle control means δA and δB detect the margin angle of converters $C_1$ and $C_2$ on the basis of the primary voltage and secondary current of the transformers TA and TB respectively and compare the detected values with a predetermined setting $\delta_o$ applied to terminals tA1 and tB1 to deliver a voltage required for attaining the coincidence therebetween. The constant current control means CIA and CIB deliver a voltage required for attaining the coincidence between the current in transmission lines L and a predetermined setting. The automatic pulse phase shifters APPSA and APPSB select one of the outputs of the constant margin angle control means and constant current control means so as to apply a firing phase of suitable timing to the converters $C_1$ and $C_2$ and may be any suitable ones known in the art. The present invention can be applied to a commonly known manner of control in which the rectifier is subject to constant current control and the inverter is subject to constant margin angle control, and such a case will be described with reference to FIG. 4. The constant margin angle control means and constant current control means employed in the present invention for the transmission power control may have a known structure and any especial description as to the structure of such means will not be given herein.

Power detectors PDA and PDB deliver a positive voltage whose level is proportional to the power being transmitted. Direct current detectors IDA and IDB deliver a voltage whose level is proportional to the direct current. These detectors may be any suitable ones known in the art and include therein proper means for smoothing out ripple components in the output. Various settings are applied to terminals tA1, tA2, tA3 and tB1. Adders AD, ADA1, ADA2, ..... ADB1, ADB2, ..... subtract the input applied by the line having the symbol "minus" (−) from the input applied by the line having the symbol "plus" (+). There are a plurality of operational amplifiers AA1, AA2, ....., AB1 and AB2, a plurality of resistors RA1, RA2, ....., RB1, RB2, ..... associated with these operational amplifiers, and a plurality of diodes $D_1$, $D_2$, ..... A switch SW is manually changed over to connect the terminal tA3 to one of contacts $a$ and $b$. Delay elements TDA and TDB are connected between the operational amplifier AA1 and the adder ADA3 and between the operational amplifier AB1 and the adder ADB3 respectively.

Before describing modification of the power being transmitted through the d.c. system on the basis of the frequency difference between the two a.c. systems A and B which is the object of the present invention, description will be given with reference to a common control in which the rectifier $C_1$ and inverter $C_2$ are operated under constant current control and constant margin angle control. The power detectors PDA and PDB are constructed so that they deliver a d.c. voltage output of, for example, 10 volts when the rectifier $C_1$ and inverter $C_2$ are operating to deliver the rated output of, for example, 300 MW and they deliver zero volts when the output of the rectifier and inverter is zero. A voltage $P_D$ corresponding to the setting of transmitted power is applied to the terminal tA2. This voltage $P_D$ is a d.c. voltage of, for example, 10 volts when the rectifier and inverter are operating to deliver the rated output. The current detectors IDA and IDB are constructed so that, when the rectifier $C_1$ and inverter $C_2$ are operating with the rated output of, for example, 300 MW and the rated voltage of, for example, 125 kV and a current value of, for example, 1200 A is detected, they deliver a d.c. voltage of, for example, 10 volts, while when zero current is detected, they deliver zero volt. A voltage $\Delta I$ corresponding to a current margin is applied to the terminal tA3 so that either the converters $C_1$ or $C_2$ can operate as a inverter. This margin is commonly selected to be of the order of 10 percent of the rated current value, and therefore, a d.c. voltage of 1 volt is commonly applied to the terminal tA3. The symbols + and − affixed to various parts mean that the signals appearing at such parts are positive and negative relative to each other.

Figure 5:
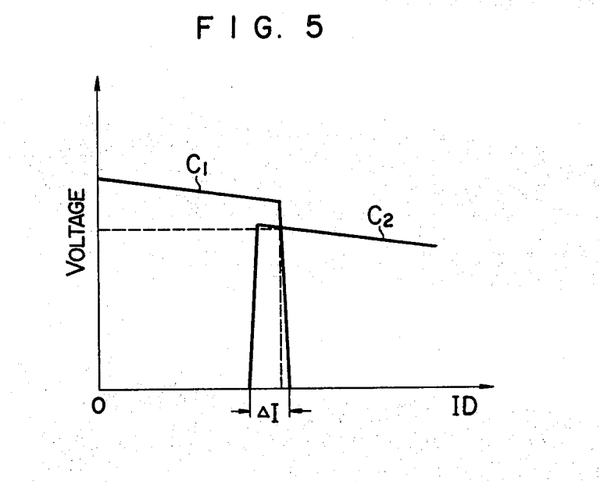
FIG. 5 is a graph showing the manner of operation of the two converters shown in FIG. 4.

Suppose that power is transmitted from the a.c. system A to the a.c. system B and the control system is operating to control the transmission of predetermined power between these two a.c. systems A and B as described with reference to FIG. 1. Suppose further that the output $\Delta P$ of a frequency control circuit AF described later is zero. Since $\Delta P = 0$, the voltage $P_D$ applied to the terminal tA2 appears at the output of the adders ADA1 and ADB1. These outputs are applied to the respective adders ADA2 and ADB2, and at the same time, to the respective adders ADA3 and ADB3. The outputs of the power detectors PDA and PDB are also applied to the respective adders ADA2 and ADB2. Since the system is operating under the rated condition, the outputs of the adders ADA2 and ADB2 are zero, and the outputs of the operational amplifiers AA1, AB1 and delay elements TDA, TDB are also zero. Due to the fact that the power is being transmitted from the system A to the system B, the converter $C_1$ and $C_2$ operate as a rectifier and an inverter respectively. The switch SW is connected to the contact $b$ and the voltage $\Delta I$ applied to the terminal tA3 is applied to the adder ADB3. Therefore, the voltage $P_D$ appears at the output of the adder ADA3 to be applied to the adder ADA4, and the voltage $P_D - \Delta I$ appears at the output of the adder ADB3 to be applied to the adder ADB4 to provide the set points for the respective constant current control means CIA and CIB. As described previously, the outputs of the individual detectors and the settings applied to the individual terminals are selected to have corresponding d.c. voltage levels in the rated condition. Thus, any especial problem does not arise even when the power setting is selected to be the set point of the constant current control means. The outputs of the direct current detectors IDA and IDB are applied in the illustrated polarity to the respective adders ADA4 and ADB4. Thus, the output of the adder ADA4 is approximately zero, while the output of the adder ADB4 is $\Delta I$, and the output of the adder ADB4 is greater than that of the adder ADA4 by $\Delta I$. It is commonly known that, when the current margin $\Delta I$ is applied to only one of the two constant current control means and the outputs of the constant margin angle control means and constant current control means are selected by the automatic pulse phase shifters APPSA and APPSB for controlling the converters $C_1$ and $C_2$ in the manner above described, one of the converters to which $\Delta I$ is applied acts as an inverter and the other acts as a rectifier. Therefore, in the case which is presently described, rectifier $C_1$ is controlled by the constant current control means CIA, while the inverter $C_2$ is controlled by the constant margin angle control means $\delta B$. These converters have operating characteristics as shown in FIG. 5 in which the vertical axis represents the d.c. transmission line voltage and the horizontal axis represents the current. These converters are operated with the voltage and current values shown by the dotted lines.

When the transmitted power is reduced for some reason, the output of the power detector PDA is reduced and the output of the adder ADA2 is changed to a positive value. The output of the adder ADA2 is amplified by the operational amplifier AA1 with the gain determined by the resistors RA1 and RA2 to be applied to the delay element TDA. Therefore, a reduction in the transmitted power causes an increase in the output of the adder ADA3 after a delay by the delay element TDA so as to increase the set point of the constant current control means CIA. As a result, the phase of the output of the automatic pulse phase shifter APPSA is varied to increase the transmitted power. Conversely, when the transmitted power is increased, the output of the adder ADA3 is reduced to reduce the transmitted power. The increase or decrease in the output of the adder ADA3 is determined by the gain of the operational amplifier AA2 which is determined by the resistors RA3 and RA4. A reduction in the transmitted power is also detected by the power detector PDB resulting in a variation of the output of the adder ADB3. However, this exerts no influence due to the fact that the inverter $C_2$ is operating under control of the constant margin angle control means.

The transmitted power can thus be suitably modified when a change occurs in the power being transmitted. From another standpoint, this means that the transmitted power can be controlled by apparently changing the power setting. The frequency control circuit AF described with reference to FIG. 1 is provided for this purpose, and the output $\Delta P$ of this frequency control circuit AF is applied to the adders ADA1 and ADB1 as shown in FIG. 4. Thus, even when any direct change may not be observed in the transmitted power, occurrence of a frequency difference $\Delta F$ between the two systems A and B is apparently equivalent to a change of the power setting, and the power being transmitted can be controlled correspondingly. For example, when $\Delta P$ is positive, the transmitted power is increased, while when $\Delta P$ is negative, the transmitted power is decreased.

However, as pointed out previously, the residual error after control is great when $\Delta P$ is merely proportional to $\Delta F$. The operation of the frequency control circuit AF which is one of the features of the present invention will now be described in detail.

The outputs of the frequency detectors FVA and FVB are applied by respective leads 100 and 200 to the frequency control circuit AF and the output $\Delta P$ appearing from the frequency control circuit AF is applied to the adders ADA1 and ADB1 by a lead 300. As described previously, $\Delta F$ is positive when the frequency of the system A is higher than that of the system B. The relation between $\Delta F$ and $\Delta P$ is selected so that $\Delta P$ is also positive when $\Delta F$ is positive and the output voltage of the adder AD detecting $\Delta F$ has a negative polarity when $\Delta F$ is positive.

Referring to FIG. 4, the operational amplifiers AA3 to AA8 amplify the input $\Delta F$ with the gain determined by the ratio between the associated input resistor and the feedback resistor. A positive bias voltage is applied to the operational amplifiers AA4 and AA5 through a terminal tA4 and resistors RA7 and RA10, while a negative bias voltage is applied to the operational amplifiers AA7 and AA8 through another terminal tA5 and resistors RA15 and RA18. The diodes $D_1$ to $D_3$ select the maximum positive voltage among the outputs of the operational amplifiers AA3 to AA5, and the diodes $D_4$ to $D_6$ select the maximum negative voltage among the outputs of the operational amplifiers AA6 to AA8. These positive and negative voltage outputs are applied to the adder composed of the resistors RA21 to RA23 and the operational amplifier AA9. This adder has a gain of unity and carries out simple addition. The output of the operational amplifier AA9 is changed in polarity by the sign change composed of the resistors RA24, RA25 and the operational amplifier AA10. Of course, the gain of this sign changer is also selected to be unity. When now the output of the adder AD is negative, the outputs of the operational amplifiers AA6 to AA8 are positive and the diodes $D_4$ to $D_6$ are cut off. Conversely, when the output of the adder AD is positive, the outputs of the operational amplifiers AA3 to AA5 are negative and the diodes $D_1$ to $D_3$ are cut off. Further, when the output of the adder AD is low and has a small positive or negative value, the outputs of the operational amplifiers AA4, AA5 and AA7, AA8 are rendered negative and positive respectively by the effect of the bias voltages and the diodes $D_2$, $D_3$, $D_5$ and $D_6$ are cut off. When, for example, the output of the adder AD is initially negative and is then increased to such a value which will cancel the effect of the bias voltage, the output of the operational amplifier AA4 becomes positive. With the further increase in the output of the adder AD, the output of the operational amplifier AA4 will finally exceed the output of the operational amplifier AA3. In such a case, the output of the operational amplifier AA4 passes through the operational amplifiers AA9 and AA10 to appear as $\Delta P$.

Figure 6:
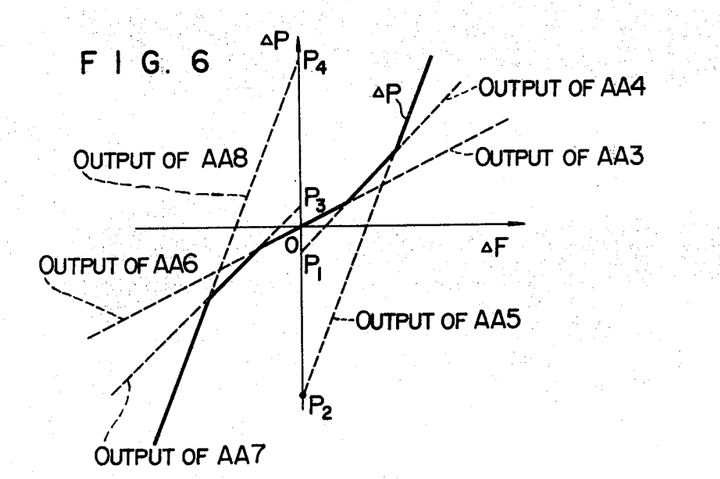
FIG. 6 is a graph showing the operating characteristics of parts of the control system shown in FIG. 4.

Therefore, the output $\Delta P$ of the frequency control circuit AF in FIG. 4 varies relative to $\Delta F$ as shown in FIG. 6. It will be seen from FIG. 6 that, when $\Delta F$ is positive, that is, when the output of the adder AD is negative, the outputs of the operational amplifiers AA3 and AA4 appear as shown by the dotted lines and the maximum value of these outputs appears as $\Delta P$ as shown by the solid line. Similarly, when $\Delta F$ is negative, the outputs of the operational amplifiers AA6 to AA8 appear as shown by the dotted lines and $\Delta P$ as shown by the solid line can be obtained. The inclination of the lines representing the outputs of these operational amplifiers AA3 to AA8 is determined by the ratio between the input resistor and the feedback resistor as described previously. The points $P_1$ to $P_4$ are determined by the magnitude of the bias voltages applied to the terminals tA4 and tA5 and by the ratio between the input resistor and the feedback resistor relative to the bias voltage. Therefore, in the embodiment shown in FIG. 4, the greater the frequency difference, $G_1$ in the equation (2) becomes greater, and the frequency difference remaining after control can be correspondingly reduced.

However, when $G_1$ in the equation (2) is greater than a certain limit, the loop gain may be increased and the control system may be rendered unstable. The embodiment shown in FIG. 4 is inadequate in such a case.

Figure 7:
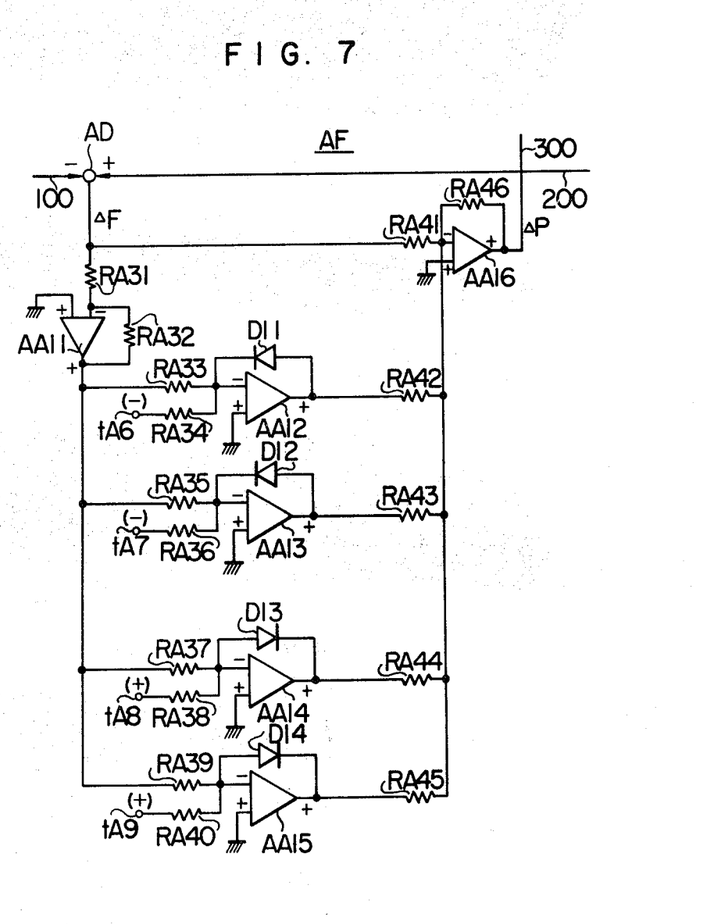
FIGS. 7, 9 and 11 are block diagrams of parts of other embodiments of the control system according to the present invention.

Another embodiment shown in FIG. 7 can be advantageously employed to deal with such a case. FIG. 7 illustrates solely a frequency control circuit AF which is adapted to operate always with the same gain so as to reduce an undesirably large frequency difference remaining after control.

Figures 8, 10, 12:
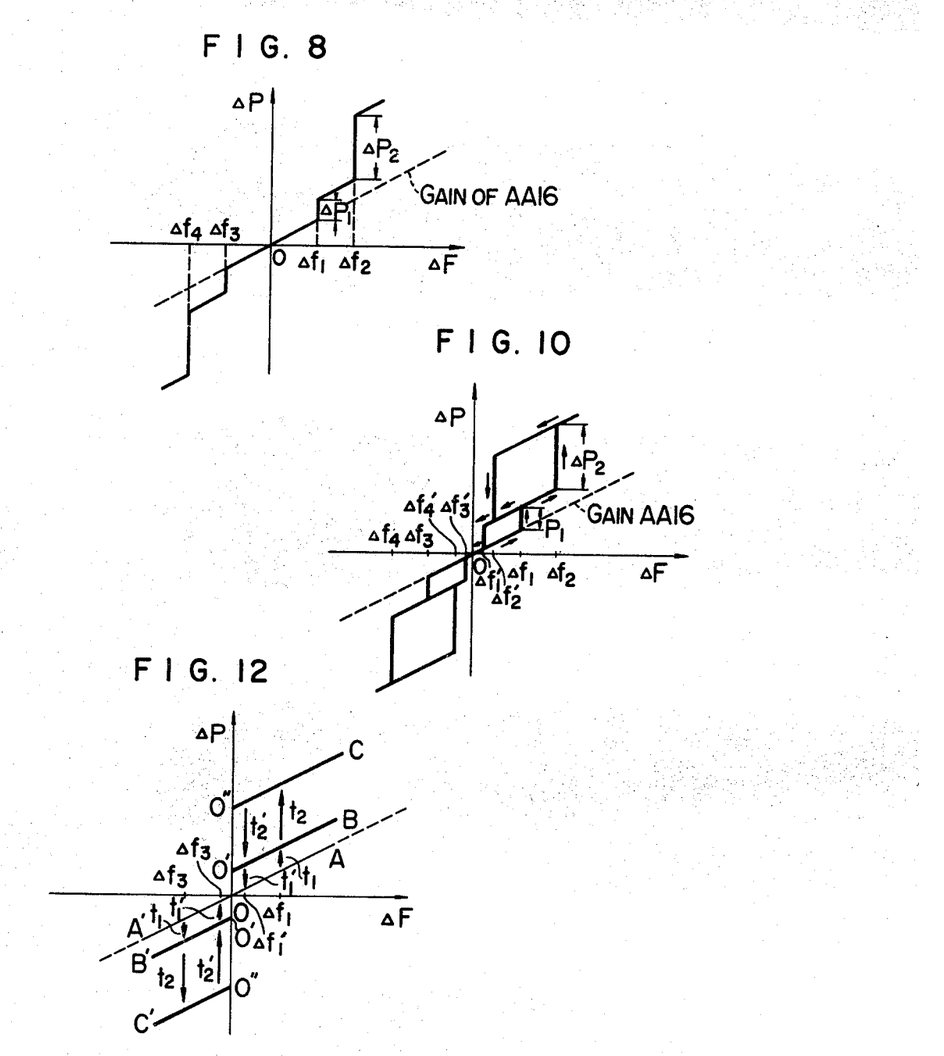
FIGS. 8, 10 and 12 are graphs showing the operating characteristics of the embodiments shown in FIGS. 7, 9 and 11 respectively.

Referring to FIG. 7, the frequency control circuit AF comprises operational amplifiers AA11 to AA16, resistors RA31 to RA46, diodes D11 to D14, and bias terminals tA6 to tA9. Negative bias voltages of different levels are applied to the bias terminals tA6 and tA7, and positive bias voltages of different levels are applied to the bias terminals tA8 and tA9. Suppose that the relation between $\Delta F$ and $\Delta P$ is similar to that described with reference to FIG. 4, then a negative output appears from the adder AD when the frequency of the system B is reduced. Therefore, by suitably determining the ratio between the input resistor RA41 and feedback resistor RA46, an output having a characteristic as shown the dotted line in FIG. 8 appears from the operational amplifier AA16. The output of the adder AD is subjected to sign change by the operational amplifier AA11 having a gain of unity determined by the input resistor RA31 and feedback resistor RA32, and the output of the operational amplifier AA11 is applied to the operational amplifiers AA12 to AA15. Due to the fact that the bias voltages of the illustrated polarities are applied to these operational amplifiers AA12 to AA15, all the diodes D11 to D14 are in the conducting state and the outputs of the operational amplifiers AA12 to AA15 are zero unless the polarity of the output of the operational amplifier AA11 is changed and the absolute value thereof exceeds those of the bias voltages. Suppose now that $\Delta F$ is increased to $\Delta f_1$ shown in FIG. 8 and the absolute value of the output of the operational amplifier AA11 is equal to that of the bias voltage applied to the bias terminal tA6. In this case, the composite input to the operational amplifier AA12 is positive and the diode D11 is cut off so that a negative constant voltage appears from the operational amplifier AA12. Therefore, the output of the operational amplifier AA16 is increased by $\Delta P_1$ which is determined by the ratio between the input resistor RA42 and feedback resistor RA46 as shown in FIG. 8. The bias voltage applied to the bias terminal tA7 may be selected so that the diode D12 is cut off when $\Delta F > \Delta f_2$. Thus, when $\Delta F$ is increased to satisfy the relation $\Delta F > \Delta f_2$, the output of the operational amplifier AA16 is increased by $\Delta P_2$ which is determined, of course, by the ratio between the input resistor RA43 and feedback resistor RA46. The bias voltages applied to the bias terminals tA8 and tA9 may be selected so that the diodes D13 and D14 are cut off when $\Delta F$ changes in the negative direction to satisfy the respective relations $\Delta F < \Delta f_3$ and $\Delta F < \Delta f_4$. In this manner, the characteristic shown in FIG. 8 can be completely obtained. Constant positive voltages delivered from the operational amplifiers AA14 and AA15 are applied to the operational amplifier AA16 through the input resistors RA44 and RA45. The positive and negative characteristics shown in FIG. 8 can be rendered entirely the same when the resistors RA42 to RA45 are selected to satisfy the relations RA42 = RA44 and RA43 = RA45.

The embodiments shown in FIGS. 4 and 7 are effective in reducing the frequency difference remaining after control. In these embodiments, however, a frequency difference of some extent may still remain due to the fact that $G_1$ in the equation (2) takes the original small value again when the resulting frequency difference becomes small.

Figure 9:
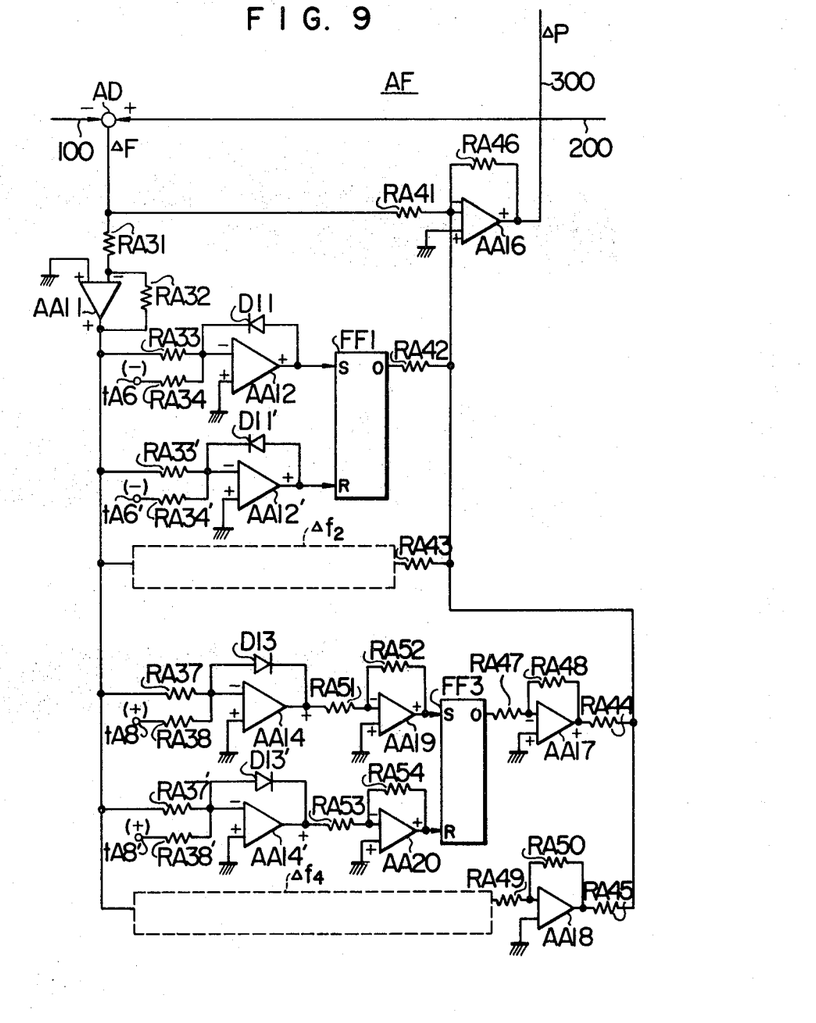

Another embodiment of the present invention for further reducing the residual frequency difference will be described with reference to FIG. 9. The embodiment shown in FIG. 9 is basically similar to the embodiment shown in FIG. 7 but differs from the latter in that there is a hysteresis in the $\Delta F - \Delta P$ characteristic in both the cases in which the frequency difference is increased and decreased as shown in FIG. 10. More precisely, as seen in FIG. 10, $\Delta P$ is increased by $\Delta P_1$ when $\Delta F$ is increased to satisfy the relation $\Delta F > \Delta f_1$, but even when $\Delta F$ is decreased to satisfy the relation $\Delta F < \Delta f_1$, $\Delta P_1$ is not immediately reduced to zero and is reduced to zero after $\Delta F$ is decreased to satisfy the relation $\Delta F < 3f_1'$. Similarly, $\Delta P$ is increased by $\Delta P_2$ when $\Delta F$ is increased to satisfy the relation $\Delta F > \Delta f_2$ and $\Delta P_2$ is removed when $\Delta F$ is decreased to satisfy the relation $\Delta F > \Delta f_2'$. The same applies to the case in which $\Delta F$ changes in the negative direction, and $\Delta P_1$ and $\Delta P_2$ are removed when $\Delta F$ is restored to respective levels $\Delta f_3'$ and $\Delta f_4'$ relative to $\Delta f_3$ and $\Delta f_4$ as will be readily seen from FIG. 10.

In FIG. 9, like reference numerals are used to denote like parts appearing in FIG. 7 and additional parts having functions similar to those shown in FIG. 7 are designated by dashed reference numerals. Further, in order to avoid confusion, circuits operating under the conditions $\Delta F > \Delta f_2$ and $\Delta F < \Delta f_4$ are shown merely by dotted blocks with $\Delta f_2$ and $\Delta f_4$ affixed thereto. Referring to FIG. 9, operational amplifiers AA17 to AA20 and associated resistors RA47 to RA54 act as sign changers whose gain is unity. Flip-flops FF1 and FF3 are set when the outputs of respective operational amplifiers AA12 and AA19 change from zero to a constant negative voltage and are reset when the outputs of respective operational amplifiers AA12' and AA20 change from a constant negative voltage to zero. In the set position, these flip-flops FF1 and FF3 deliver a constant negative voltage. Therefore, when now bias voltage of illustrated polarities corresponding to $\Delta f_1'$ and $\Delta f_2'$ are applied to terminals tA6' and tA8 respectively, it will be easily understood from the description given with reference to FIG. 7 that the flip-flop FF1 is set when $\Delta F > \Delta f_1$ and is reset when $\Delta F > \Delta f_1'$. In response to the setting of the flip-flop FF1, a stepwise changing output appears from the operational amplifier AA16 as in the embodiment shown in FIG. 7. It will be also easily understood that the flip-flop FF3 is set and reset when $\Delta F < \Delta f_3$ and $\Delta F < \Delta f_3'$ respectively. It is apparent that the characteristic shown in FIG. 10 can be realized when the blocks labelled $\Delta f_2$ and $\Delta f_4$ whose detailed structure is not illustrated have a structure similar to that of the flip-flops FF1 and FF3.

Figure 11:
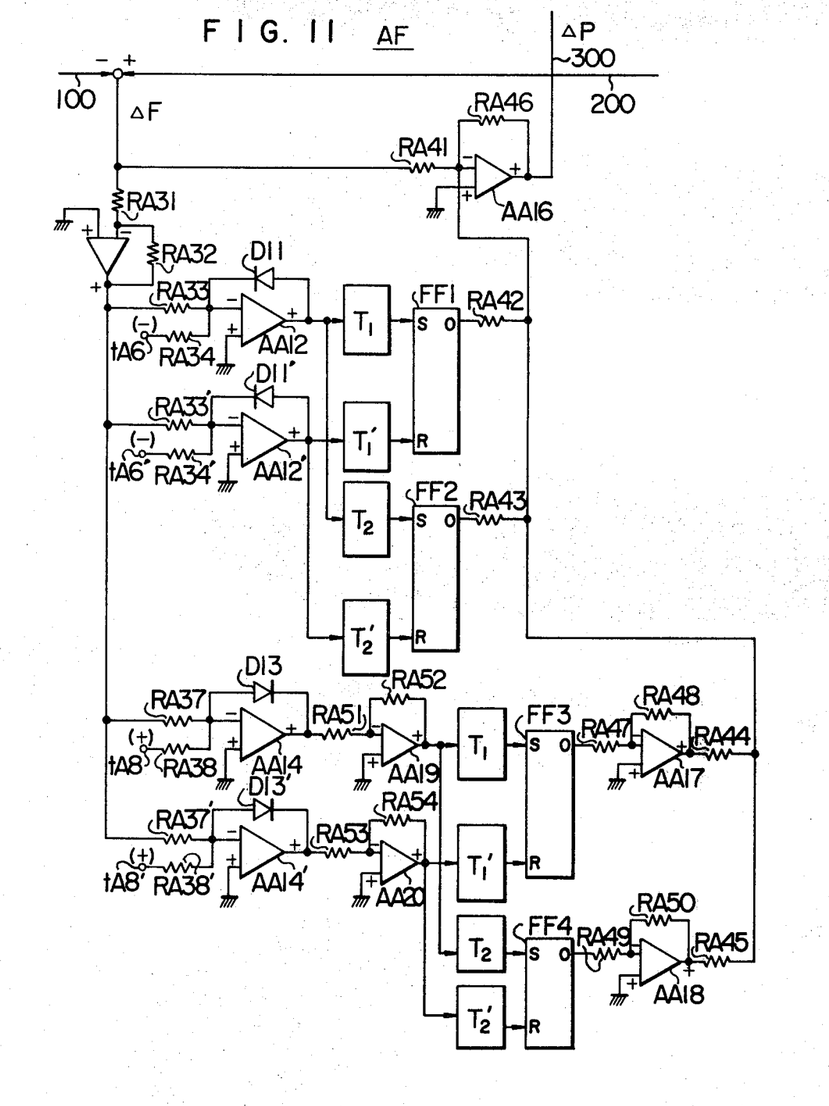

In FIG. 10, the $\Delta F - \Delta P$ characteristic draws hysteresis loops depending on the value of $\Delta F$. Another embodiment of the present invention shown in FIG. 11 differs from the embodiment shown in FIG. 9 in that a $\Delta F - \Delta P$ characteristic as shown in FIG. 12 is obtained. More precisely, as seen in FIG. 12, the $\Delta F - \Delta P$ characteristic is shifted parallelly as shown by OA, O'B, O''C and OA', O'B', O''C' when detection of $\Delta F > \Delta f_1$ and $\Delta F < \Delta f_3$ lasts for more than predetermined periods of time $t_1$ and $t_2$ respectively, and this characteristic is restored toward OA and OA' when the states of $\Delta F < \Delta f_1'$ and $\Delta F > \Delta f_3'$ last for more than predetermined periods of time $t_1'$ and $t_2'$ respectively. In FIG. 11, like reference numerals are used to denote like parts appearing in FIG. 9. Timers $T_1$ and $T_2$ generate an output when operational amplifiers AA12 and AA19 deliver a constant negative output, that is, in the predetermined periods of time $t_1$ and $t_2$ after detection of $\Delta F > \Delta f_1$ and $\Delta F < \Delta f_3'$ respectively. Timers $T_1'$ and $T_2'$ generate an output when operational amplifiers AA12' and AA20 delivering a constant negative output case to deliver such output, that is, in the predetermined periods of time $t_1$ and $t_2$ after detection of $\Delta F < \Delta f_1'$ and $\Delta F > \Delta f_3'$ respectively. Flip-flops FF1 to FF4 are set by the outputs of the timers $T_1$ and $T_2$ and are reset by the outputs of the timers $T_1'$ and $T_2'$ respectively. The output of an operational amplifier AA16 changes stepwise as in FIG. 9 depending on the outputs of these flip-flops FF1 to FF4.

Therefore, in the embodiment shown in FIG. 11, a constant negative output appears from the operational amplifier AA12 to energize the timers $T_1$ and $T_2$ when $\Delta F$ is increased to give the relation $\Delta F > \Delta f_1$. When this state continues for more than the predetermined period of time $t_1$, an output appears from the timer $T_1$ and the output of the operational amplifier AA16 makes a stepping change to 0'B. When the operational amplifier AA12 continues to deliver still its output in spite of the change of the output of the operational amplifier AA16 to the level 0'B, an output appears from the timer $T_2$ in the predetermined period of time $t_2$ ($t_1 < t_2$). Therefore, the output of the operational amplifier AA16 makes a stepping change from 0'B to 0''C. As a result of the increase in $\Delta P$ for increasing the power being transmitted $\Delta F$ is decreased until finally the relation $\Delta F < \Delta f_1'$ is satisfied. When this relation is satisfied, the constant negative output of the operational amplifier AA12' ceases to appear with the result that the timers $T_1'$ and $T_2'$ are energized. The $\Delta F - \Delta P$ characteristic is restored from 0''C to 0'B when this state continues for more than the predetermined period of time $t_2'$, and after another predetermined period of time $t_1'$ ($t_2' < t_1'$), the $\Delta F - \Delta P$ characteristic is restored to 0A. Similar operation is carried out when $\Delta F$ changes in the negative direction. It will thus be understood that, in the embodiment shown in FIG. 11, the basic control operation takes place after substantially complete elimination of the frequency difference so that the frequency difference which may still remain after control can be reduced to a minimum. A very effective frequency control can be attained especially when the settings of the timers in FIG. 11 are determined in relation to the operating timing of the governors for the generators in the individual a.c. systems.

It will be understood from the foregoing detailed description of the present invention that the difference between the frequencies of two a.c. systems interconnected by a d.c. system can be reduced to a minimum by the effect of d.c. interconnection even when failure of proper power supply occurs in one of the interconnected a.c. systems resulting in a great reduction of the frequency. The present invention is especially effective in stabilizing the frequency of an a.c. system the scale of which is small compared with that of another a.c. system in an interconnected arrangement of two a.c. systems.

The embodiments described hereinbefore have referred to the case in which $\Delta P$ relative to the frequency difference $\Delta F$ is controlled over three stages depending on the values of $\Delta F$, but it is apparent that a more precise control can be attained when the number of these stages is further increased.

Further, the foregoing description has referred to the manner of control for reducing the frequency difference $\Delta F$ between two a.c. systems. However, when the capacity of one of the two a.c. systems is smaller than the other and it is desired to stabilize the frequency of the a.c. system of smaller capacity, the manner of control may be such that the error ΔF relative to the standard frequency of the specific a.c. system may be reduced to a minimum.

Further, when the two a.c. systems interconnected by the d.c. system have different standard frequencies, ΔF should be normalized frequency difference, or percent difference in relation to the respective standard frequencies.

From the standpoint of merely eliminating an undesirable offset remaining after control, the frequency control circuit AF shown in FIG. 1 may be modified into a so-called proportional plus integral type of control circuit so that the power in the d.c. transmission line can be increased by the integrating means until the offset is eliminated. However, resorting to such integrating means for the elimination of the offset is disadvantageous. More precisely, the method in which the circuit for integrating the frequency difference ΔF is provided in parallel with the feedback route for the frequency difference ΔF is disadvantageous in that the gain thereof cannot be appreciably increased from the viewpoint of the stability of control and the purpose of reducing the error within a short period of time cannot be attained. Therefore, additional disposition of such integrating circuit in the present invention is effective only when a higher precision is demanded at the sacrifice of the period of time required for control, but the method resorting to this integrating circuit for the elimination of the offset is undesirable.

Another important advantage of the present invention over the system employing the integrating circuit is that stability of a.c. systems can be more reliably maintained than in the latter. It is difficult to maintain stable operation of an a.c. system when the frequency thereof is lowered to a value below a predetermined limit. Therefore, supply of power from another a.c. system becomes especially important with the increase in the degree of lowering of the frequency. According to the present invention, the effective gain is increased with the increase in the degree of lowering of the frequency and the reinforcing power can be increased within a short period of time.

It is apparent that the present invention is in no way limited to specific embodiments above described and various modifications may be made in the circuitry thereof. Further, it is apparent that, even when the control system shown in FIG. 4 does not include so-called constant power control means and includes merely constant current control means and constant margin angle control means, the present invention may be applied directly to such a system by utilizing ΔP for modifying the set point of the constant current control means.

What is claimed is:

1. A control system for a system interconnection consisting of two a.c. systems interconnected by a d.c. power transmission system, comprising a rectifier and an inverter in said d.c. power transmission system, means including at least constant current control means associated with said rectifier for controlling the current in said d.c. power transmission system to a constant value, and means for modifying the set point of said constant current control means depending on the frequency difference between the two a.c. systems so that the set point of said constant current control means can be greatly modified with the increase in the frequency difference, said means for modifying including first means for detecting the frequencies of the respective a.c. systems to convert the same into corresponding voltage signals, second means for seeking the difference between the frequencies of the two a.c. systems on the basis of the voltage signal outputs of said first means, third means for amplifying the output of said third means representing the frequency difference, and fourth means connected to said third means for delivering a signal for modifying the current setting of the d.c. power transmission system, said third means having a non-linear characteristic so that the rate of increase or decrease in the power being trammsmitted through the d.c. power transmission system can be greatly increased with the increase in the frequency difference.

2. A control system as claimed in claim 1, comprising a plurality of comparators for comparing the frequency difference with a plurality of different settings, and an adder for seeking the sum of the frequency difference and the outputs of said comparators, the output of said adder providing said modifying signal.

3. A control system as claimed in claim 2, wherein said comparators are set to have a hysteresis characteristic in providing the outputs relative to the frequency difference.

4. A control system as claimed in claim 3, wherein said hysteresis characteristic is obtained by provision of timer means in said control system.

\* \* \* \* \*